TELEPHONE DIAL LIGHT ATTACHMENT

Filed April 28, 1949 3 Sheets-Sheet 1

INVENTOR,
CLARENCE J. CAROSELLI,
BY Herbert A. Minturn,
ATTORNEY.

July 25, 1950 C. J. CAROSELLI 2,516,676

TELEPHONE DIAL LIGHT ATTACHMENT

Filed April 28, 1949 3 Sheets-Sheet 2

INVENTOR,
CLARENCE J. CAROSELLI,
BY Herbert A. Minturn
ATTORNEY.

INVENTOR,
CLARENCE J. CAROSELLI,
BY Herbert A. Minturn,
ATTORNEY.

Patented July 25, 1950

2,516,676

UNITED STATES PATENT OFFICE 2,516,676

TELEPHONE DIAL LIGHT ATTACHMENT

Clarence J. Caroselli, Indianapolis, Ind.

Application April 28, 1949, Serial No. 90,067

6 Claims. (Cl. 179—90)

This invention relates to a telephone dial lighting device.

A primary object of the invention is to provide a device for lighting the dial of a telephone which can be easily and detachably installed on a dial telephone.

A further important object of the invention is to provide a device for lighting the dial of a telephone which will illuminate the telephone dial while and when the telephone transmitter and receiver is removed from its cradle, and which will stop illuminating said dial when it is returned to its cradle.

A further important object of the invention is to provide a device which will illuminate the dial of a telephone with a small consumption of electrical power.

A further important object of the invention is to provide a device which will illuminate the dial of a telephone from a source of power separate from the normal house lighting system.

Still further objects and purposes of the invention will become apparent to those versed in the art from the following description of one particular form of the invention as illustrated in the accompanying drawings, in which Fig. 1 is a view in side elevation of a device embodying the invention installed on a dial telephone base, with fragmentary portions thereof being broken away;

Similar numerals refer to similar parts throughout the several views.

Figure 1:
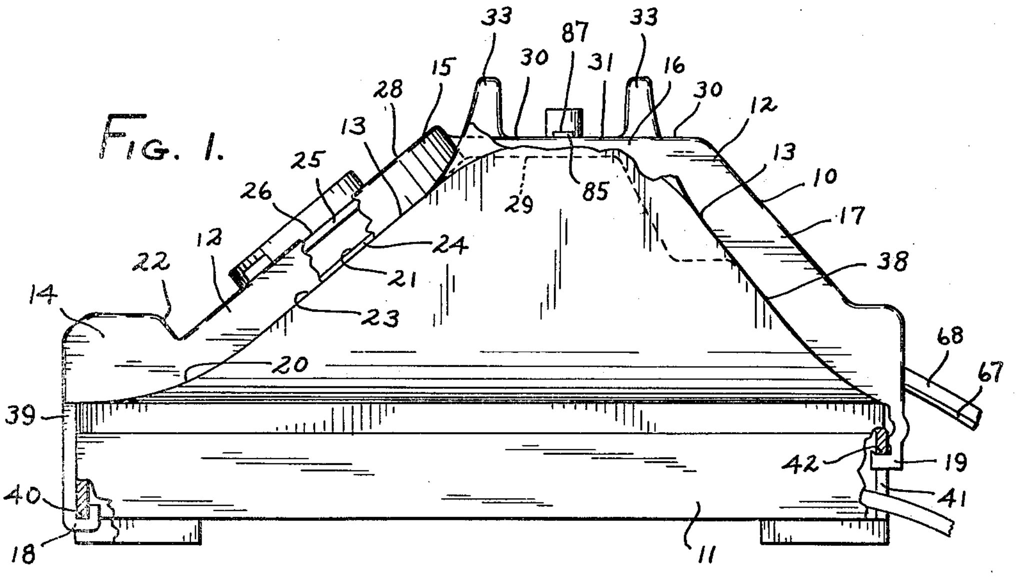
Figure 2:
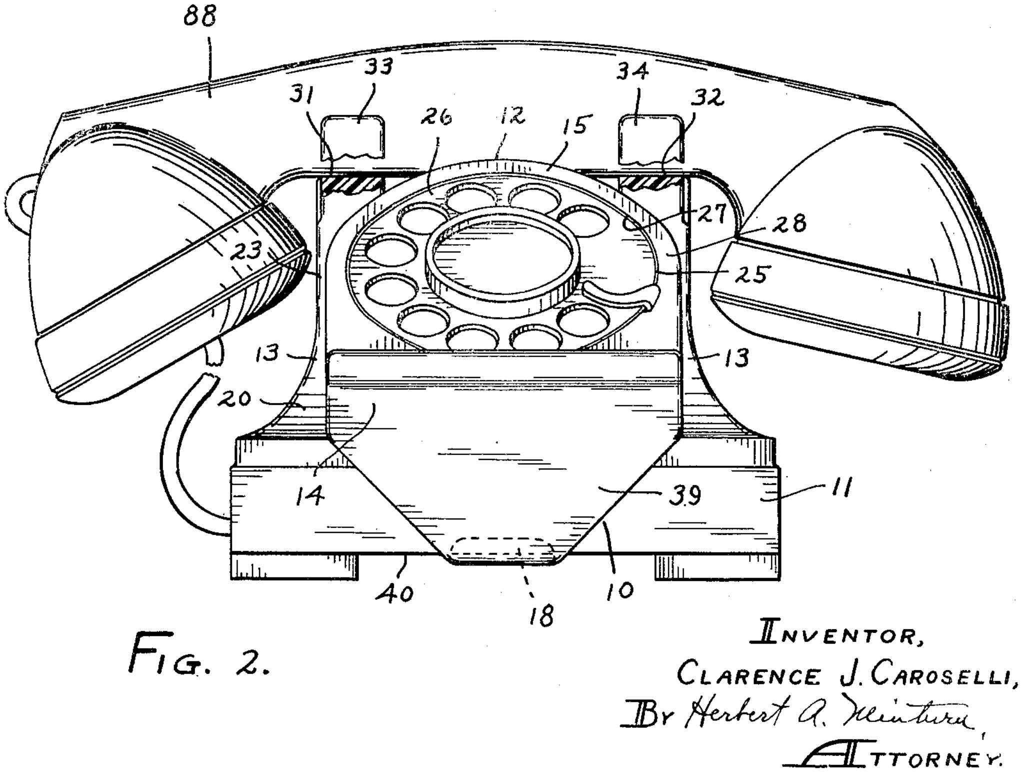
Fig. 2 is a view in front elevation thereof, showing in addition the transmitter and receiver unit resting in the cradle on the base.
Figure 3:
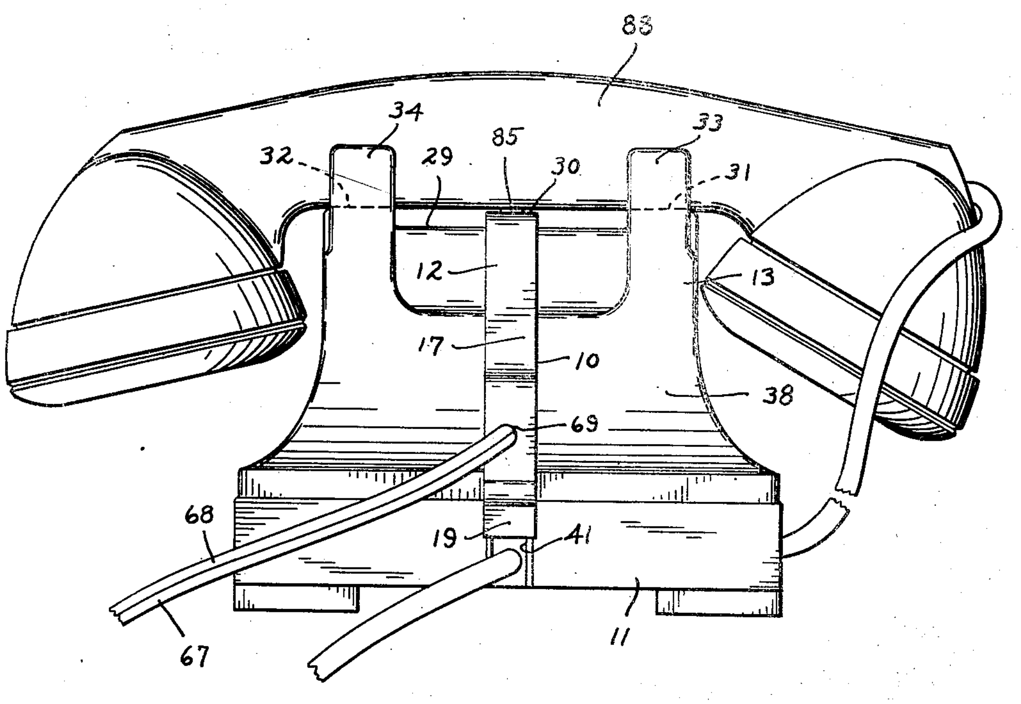
Fig. 3 is a view in rear elevation thereof.

The device 10 embodying the invention is shown in a form adapted for use with the modern dial telephone base 11 shown in Figures 1, 2, and 3.

A frame 12 fits on and across the generally V-shape top surface 13 of the base 11 to provide a housing for and to maintain other elements in their proper relationship. The frame 12 consists of a lamp housing 14, a dial housing 15, a switch housing 16, a rear channel 17, and front and rear retaining hook portions 18 and 19. The lamp housing 14 rests on the front arcuate surface 20 of the base 11 in front of and below the telephone dial 21. The dial housing 15 extends upwardly from the rear wall 22 of the lamp housing 14 up the inclined front surface 23 of the base to surround and freely enclose the outer edges 24 and 25 respectively of the telephone dial 21 and telephone finger dial plate 26. A circular opening 27 in the top 28 of the dial housing 15 permits easy access to dial plate 26. The switch housing 16 consists of a horizontal channel having an inverted U-shaped cross section extending from the top 28 of the dial housing 15 across the top center 29 of the base 11.

A top 30 of the switch housing 16 is in substantially the same plane, or slightly therebelow, as the horizontal, flat top surfaces 31 and 32 of the handset cradle crotches 33 and 34 respectively. The rear channel 17 is inverted U-shaped, and extends downwardly from the switch housing 16 down the inclined rear surface 38 of the base 11. The front hook 18 extends downwardly from the front 39 of the lamp housing 14 to hook over the front bottom edge 40 of the base 11 to connect the frame 12 to said front edge 40. The rear hook 19 extends downwardly from the rear channel 17 into a vertical slot 41 which normally appears on the rear side of the base 11, to secure the frame 12 to the edge 42 across the upper end of the slot 41.

The entire frame 12 is integrally formed from a resilient plastic insulating substance such as a phenol formaldehyde resin, but other substances will suggest themselves to those skilled in the art.

A cylindrical ring member 43, formed from any suitable transparent substance, such as an acrylic resin, is carried by the top 28 of the dial housing 15 in a position spaced from and surrounding the outer edges 24 and 25 of the dial 21 and dial plate 26 respectively. This cylindrical member 43 is centered around the dial 21 and is at right angles to the plane of said dial 21. The outer side of the top half of said member is provided with a reflecting surface 45 in order to provide a surface to reflect light passing through the remaining part of the member 43, such as would come principally from inside the housing 14.

A flat mounting panel 46 formed from an insulating material such as an acrylic resin, is carried by its ends being received in vertical notches 47 and 48 inside the lamp housing 14 in a position spaced from and parallel to the front wall 39 of said housing 14.

A conductor plate 49 lies in contact with and extends along the panel 46 on the side removed from the wall 39. This plate 49 opens through the panel 46 with integral screw-threaded, spaced apart ferrules 53 and 54, in which are carried respectively the lamps 55 and 56 respectively, directed toward the member 43.

Figures 4, 5, 6:
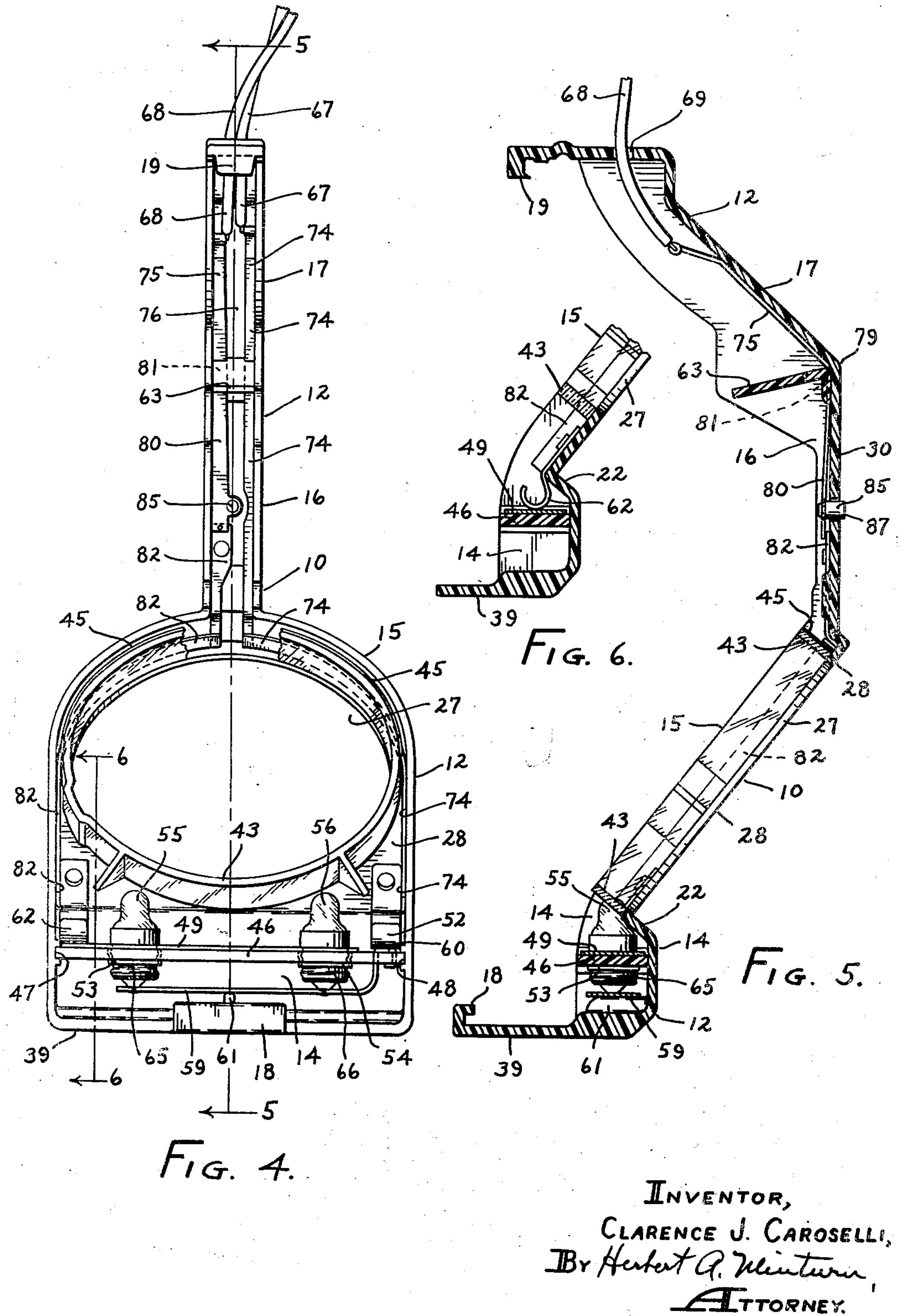
Fig. 4 is a bottom plan view of a device embodying the invention.
Fig. 5 is a view in section on the line 5—5 in Fig. 4.
Fig. 6 is a view in section on the line 6—6 in Fig. 4.

An electric conducting spring tongue 59 is positioned to extend along the panel 46 in spaced relation therefrom and between it and the wall 39, Figs. 4 and 5. This tongue 59 is secured by an end 60 carried through the panel 46 to extend a distance across that side on which the plate 49 is located, but in spaced relation from that plate 49. A rib 61 extends centrally and rearwardly from the wall 39 to form a fulcrum over which the tongue 59 is yieldingly bent tending to force the tongue 59 back into compressive contact with the bases 65 and 66 of the lamps 55 and 56.

It should be noted that this panel 46 complete with conductor 49, the tongue 59, and the lamps 55 and 56 can be removed from the housing 14 by sliding the panel 46 from the notches 47 and 48. This is useful for repair of the unit, to change lamps, or for substitution of a new panel unit.

Insulated conductors 67 and 68, Fig. 4, are connected to a source of electrical power not shown in the drawings. The type power source depends on the type lamps used in the installation and the wiring of the frame. Due to the fact that only a small area is lighted by the frame, a flashlight battery and lamps can be used effectively. The use of a battery power source also provides a source of power for lighting the telephone dial independent of the regular room lighting system, such as might be desirable upon failure of a central power source.

These conductors 67 and 68 enter the rear channel 17 through the hole 69 and extend upwardly inside thereof to about half the length of the channel 17. These conductors 67 and 68 respectively are connected to flat conductors 74 and 75 respectively, by any suitable means such as by soldering.

The conductor 74 extends up the right-hand side of the top 76 of the channel 17, Fig. 4, across the housing 16, to turn on edge and extend around the member 43, then into the lamp housing 14, to terminate in the loop spring 52, yieldingly pressing on the tongue end 60.

The other conductor 75 is formed from spring metal. It extends from the conductor 68 inside the channel 17 and is angulated at the intersection 79 of the top 76 of the channel 17 with the top 30 of the switch housing 16 to merge therefrom into a straight horizontal member 80 extending across the inside of the top 30 of the switch housing 16. This horizontal member 80 of the spring 75 is secured against the top 30 of the switch housing 16 at 81 near the intersection 79 such as by passing over the reinforcing web 63, Fig. 5. The member 80 yieldingly tends to lie in contact with the top 30, but is held therefrom by normally bearing in overlapping relation upon the end of a conductor 82 which terminates thereunder.

The conductor 82 extends from the switch housing 16, down and around the ring member 43, by being turned on edge, then down into the lamp housing 14, to terminate in the spring loop 62, which yieldingly bears on the conductor plate 49.

A cylindrical button 85 is formed to pass freely in vertical directions through the top 30 of the switch housing 16. This button 85 is secured to the member 80. The length of the button is such that in the absence of external forces, the spring member 80 constrains the button 85 in that position to have its outer end 87 extend above the level of the surfaces 31 and 32.

In this position the spring end 80 of the conductor 75 is in contact with the conductor 82.

In operation, the handset 88 is normally positioned on the cradle formed by the crotches 33 and 34. The weight of the handset 88 depresses the button 85; the conductors 75 and 82 are held apart, and the lamp electrical circuit is then open. However, when the handset 88 is removed from its cradle, spring action of the member 80 forces the button 85 upwardly, and the member 80 comes into contact with the conductor 82, to close the circuit to permit the lamps 55 and 56 to be illuminated. When the handset 88 is returned to the cradle the lamps 55 and 56 are deenergized in the open circuit condition.

While I have herein shown and described the particular form of my invention now best known to me, it is obvious that structural variations may be employed, particularly those necessary to adapt my device for a different style of dial telephone, without departing from the spirit of my invention, and I therefore do not desire to be limited to this precise form beyond the limitations which may be imposed by the following claims.

I claim:

1. A detachable dial lighting device for a telephone having a base with front and rear downwardly extending edge portions, a receiver, a dial on the base, a finger dial plate spaced above the dial, and a pair of spaced apart cradle crotches to carry the telephone receiver, comprising in combination, a frame formed to straddle said base; hook means for detachably engaging under said edge portions; said frame having a dial housing and a lamp housing integrally formed therein; said dial housing having side walls enclosing the circumferential edges of the dial and finger dial plate, and a circular top opening to permit free access to the finger dial plate and sight of the dial; said lamp housing and said dial housing having a window therebetween; a lamp in said lamp housing having at least a major portion of its illuminating surface disposed between the planes of said dial and said finger dial plate to illuminate said dial through said window; and conducting means through the frame to supply power to said lamp.

2. A detachable dial lighting device for a telephone having a base with front and rear downwardly extending edge portions, a receiver, a dial on the base, a finger dial plate spaced above the dial, and a pair of spaced apart cradle crotches to carry the telephone receiver, comprising in combination, a frame formed to straddle said base, hook means for detachably engaging under said edge portions; said frame having a dial housing and a lamp housing integrally formed therein; said dial housing having side walls enclosing the circumferential edges of the dial and finger dial plate, and a circular top opening to permit free access to the finger dial plate and sight of the dial; said lamp housing and said dial housing having a window therebetween; a lamp in said lamp housing having at least a major portion of its illuminating surface disposed between the planes of said dial and said finger dial plate to illuminate said dial through said window; and conducting means through the frame to supply power to said lamp; a push button carried by the frame to project upwardly therefrom between the cradle crotches to be normally depressed by the receiver when properly placed in said crotches; and switch means in said conducting means opened by depression of said button.

3. A detachable dial lighting device for a telephone having a base with front and rear downwardly extending edge portions, a receiver, a dial on the base, a finger dial plate spaced above the dial, and a pair of spaced apart cradle crotches to carry the telephone receiver, comprising in combination, a frame formed to straddle said base, hook means for detachably engaging under said edge portions; said frame having a dial housing and a lamp housing integrally formed therein; said dial housing having side walls enclosing the circumferential edges of the dial and finger dial plate, and a circular top opening to permit free access to the finger dial plate and sight of the dial; said lamp housing and said dial housing having a window therebetween; a lamp in said lamp housing having at least a major portion of its illuminating surface disposed between the planes of said dial and said finger dial plate to illuminate said dial through said window; and conducting means through the frame to supply power to said lamp; a push button carried by the frame to project upwardly therefrom between the cradle crotches to be normally depressed by the receiver when properly placed in said crotches; and switch means in said conducting means opened by depression of said button; a semi-cylindrical reflector carried by said frame inside the dial housing on the side of the dial opposite said lamp housing, said reflector extending around the outer circumferential edges of the upper halves of said dial and finger dial plate.

4. A detachable dial lighting device for a telephone having a base, a receiver, a dial on the base, a finger dial plate spaced above the dial, and a pair of spaced apart handset cradle crotches to carry the receiver, comprising in combination, a resilient plastic frame extending from the front of the telephone base rearwardly over the dial and finger dial plate, over the top of the base between the handset cradle crotches, and then downwardly to the rear surface of said base, integrally formed hooks on the front and rear of said frame to detachably secure the front and rear of said frame to the lower edges of the front and rear of said telephone base, said hooks being biased by the resilient preformed set in said frame into engagement with the front and rear lower edges of said base; said frame having a dial housing, a lamp housing, and a switch housing integrally formed therein; said dial housing having side walls enclosing the circumferential edges of the dial and finger dial plate, and having a central circular opening in its top surface to permit free access to said finger dial plate and examination of said dial; said lamp housing being juxtaposed with the front portion of said dial housing, said dial housing and said lamp housing having a passageway therebetween; a plurality of lamps in said lamp housing, each of said lamps having at least the major portion of its illuminating surface disposed between the plane of said dial and the plane of said finger dial plate, thereby illuminating said dial without the casting of shadows; a circuit to supply power to said lamps; said switch housing being positioned to the rear of the dial housing on the top of the telephone base between the handset cradle crotches; a push button carried in the top surface of said switch housing to be depressed by the receiver when properly placed in the cradle; circuit control means opened by depression of said button; a semi-cylindrical reflector carried by the frame inside of the dial housing in a position spaced from the outer circumferential edges of the top halves of the dial and finger dial plate.

5. For illuminating a dial operated, handset telephone having a housing with front and back downturned edges, and laterally spaced apart cradles on the uppermost part of the housing to receive thereacross the combined receiver and transmitter unit a removable lighting attachment comprising a frame shaped to conform to the contour of the housing from front to back to straddle the housing between said cradles and have its ends in juxtaposition with said housing edges; a hook on each of said frame ends engageable under said housing edges to retain the frame removably fixed across the housing; said housing having a central opening in its forward portion to have the frame extend closely around the dial but out of contact therewith; a lamp chamber in the frame forwardly and below said opening; lamp means in the chamber; a lamp control switch carried by the frame to have an operating button biased to an open switch condition when pressed downwardly, said button being positioned along the frame to be between said cradles in the path of and pressed downwardly by said receiver and transmitter unit when rested on said cradles; and electrical conductors carried by the frame from its rear end portion to said switch and to said lamp means.

6. For illuminating a dial operated, handset telephone having a housing with front and back downturned edges, and laterally spaced apart cradles on the uppermost part of the housing to receive thereacross the combined receiver and transmitter unit a removable lighting attachment comprising a frame shaped to conform to the contour of the housing from front to back to straddle the housing between said cradles and have its ends in juxtaposition with said housing edges; a hook on each of said frame ends engageable under said housing edges to retain the frame removably fixed across the housing; said housing having a central opening in its forward portion to have the frame extend closely around the dial but out of contact therewith; a lamp chamber in the frame forwardly and below said opening; lamp means in the chamber; a lamp control switch carried by the frame to have an operating button biased to an open switch condition when pressed downwardly, said button being positioned along the frame to be between said cradles in the path of and pressed downwardly by said receiver and transmitter unit when rested on said cradles; and electrical conductors carried by the frame from its rear end portion to said switch and to said lamp means; said conductors comprising two members, one extending around one side and the other around the other side of said frame opening to enter said lamp chamber to have spaced apart end terminals therein; a panel; a conducting plate on the panel to have one end portion in the path of one of said end terminals; said lamp means comprising a lamp having its base entered through said panel plate to be in contact with said plate; a second plate carried by said panel to have an end in the path of the other of said terminals, the second plate being mounted across the face of the panel opposite that carrying the first plate, said lamp base contacting said second plate by its central terminal; and abutments in said lamp chamber upon which the ends of said panel rest to have said plate ends in respective contact with said conductor terminals and to direct the lamp toward said frame opening for dial illumination.

CLARENCE J. CAROSELLI.

REFERENCES CITED

The following references are of record in the file of this patent:

UNITED STATES PATENTS

| Number | Name | Date |
|---|---|---|
| 1,113,537 | Boze | Oct. 13, 1914 |
| 1,153,349 | Smith | Sept. 14, 1915 |
| 1,747,976 | Hitt | Feb. 18, 1930 |
| 1,752,211 | Szwajkart | Mar. 25, 1930 |
| 1,893,325 | Foster | Jan. 3, 1933 |
| 1,955,972 | Muse | Apr. 24, 1934 |
| 1,959,572 | Craig | May 22, 1934 |
| 1,971,227 | Maxwell | Aug. 21, 1934 |
| 1,979,183 | Williams | Oct. 30, 1934 |
| 1,982,457 | Schmitt | Nov. 27, 1934 |
| 1,985,172 | Keller | Dec. 18, 1934 |
| 2,222,476 | Caroselli | Nov. 19, 1940 |
| 2,247,591 | Sundee | July 1, 1941 |
| 2,259,148 | Bukhart | Oct. 14, 1941 |
| 2,365,864 | Chapman | Dec. 26, 1944 |